(12) United States Patent
Alarifi et al.

(10) Patent No.: US 9,321,868 B2
(45) Date of Patent: Apr. 26, 2016

(54) SYNTHESIS OF ACRYLIC OR METHACRYLIC ACID/ACRYLATE OR METHACRYLATE ESTER POLYMERS USING PERVAPORATION

(75) Inventors: Abdullah Saad Alarifi, Riyadh (SA); Taieb Aouak, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 12/786,423

(22) Filed: May 24, 2010

(65) Prior Publication Data
US 2011/0124829 A1     May 26, 2011

(30) Foreign Application Priority Data

Nov. 20, 2009   (EP) ..................................... 09014511

(51) Int. Cl.
*C08F 8/14* (2006.01)
*C08F 220/06* (2006.01)
*C08F 220/18* (2006.01)

(52) U.S. Cl.
CPC .................. *C08F 220/06* (2013.01); *C08F 8/14* (2013.01); *C08F 220/18* (2013.01)

(58) Field of Classification Search
CPC ............ C08F 8/14; C08F 20/06; C08F 20/18; C08F 220/06; C08F 220/18; C08J 2300/02
USPC ................. 525/330.1, 384; 526/317.1, 318.3, 526/318.4
See application file for complete search history.

(56) References Cited

U.S. PATENT DOCUMENTS

| | | | | |
|---|---|---|---|---|
| 5,156,740 A * | 10/1992 | Bruschke | ....................... | 210/490 |
| 5,756,694 A * | 5/1998 | Weuthen | ....................... | 536/18.5 |
| 6,726,854 B2 | 4/2004 | Sutoris et al. | | |
| 2009/0240023 A1* | 9/2009 | Valls et al. | ..................... | 528/303 |
| 2010/0062500 A1* | 3/2010 | Haring | ......................... | 435/134 |

FOREIGN PATENT DOCUMENTS

| | | |
|---|---|---|
| DE | 1067806 B | 10/1959 |
| DE | 2838691 A1 | 3/1979 |
| EP | 071239 * | 2/1983 |
| WO | 9007487 A1 | 7/1990 |
| WO | 9737962 A1 | 10/1997 |
| WO | WO 2006/050850 A1 * | 5/2006 |
| WO | WO 2007/063037 A2 * | 6/2007 |
| WO | WO 2009/016646 A1 * | 2/2009 |

OTHER PUBLICATIONS

Wasewar et al., International Journal of Chemical Reactor Engineering 6 (2008) 1-17.*
http://web.archive.org/web/20090225094718/http://en.wikipedia.org/wiki/Azeotrope, Feb. 2009.*
Wikipedia "C-Terminus", http://en.wikipedia.org/wiki/C_terminus, Jan. 2014.*
Ramirez, M.; C. Antarctica Lipase B Enzyme Report; downloaded Nov. 20, 2014; http://www.bmb.uga.edu/bcmb8010/moremen/EnzymeReport/Reports/Ramirez.pdf.*
http://web.archive.org/web/20091119072656/http://en.wikipedia.org/wiki/Acid; 2009.*
Dupong et al.; "Heteropolyacids supported on activated carbon as catalysts for the esterification of acrylic acid by butanol"; Applied Catalysis A: General: vol. 129, Issue 2; Aug. 31, 1995: pp. 217-227.
Jaques et al.; "Acid-catalysed ether fission Part II. Diethyl ether in aqueous acids": J. Chem. Soc.: 1964: pp. 2683-2689.
Khurana et al.; "Sonochemical Esterification of Carboxylic Acids in Presence of Sulphuric Acid"; Synthetic Communications; vol. 20, Issue 15: Aug. 1990; pp. 2267-2271.
Cao et al. ; "Permeation and separation of styrene/ethylenzene mixtures through cross-linked poly(hexamethylene sebacate) membranes", Journal of Membrane Science; vol. 156, Issue 1; Apr. 24, 1999: pp. 43-47.
Wasewar et al.; "Pervaporation Reactor for Esterification of Acetic Acid with n-Butanol: Modeling and Simulation"; International Journal of chemical Reactor Engineering; vol. 6 A93; 2008.

* cited by examiner

*Primary Examiner* — Roberto Rabago
(74) *Attorney, Agent, or Firm* — Hauptman Ham, LLP

(57) ABSTRACT

Products and processes relating to the synthesis of copolymers or terpolymers are described. In particular, poly(acrylic acid-co-acrylate ester), poly(methacrylic acid-co-methacrylate ester), poly(acrylic acid-co-acrylate ester(I)-co-acrylate ester(II)), or poly(methacrylic acid-co-methacrylate ester(I)-co-methacrylate ester(II)), by esterification of polyacrylic or polymethacrylic acid with alcohols assisted by the pervaporation technique for extracting water are described.

19 Claims, No Drawings

SYNTHESIS OF ACRYLIC OR METHACRYLIC ACID/ACRYLATE OR METHACRYLATE ESTER POLYMERS USING PERVAPORATION

CROSS-REFERENCE TO RELATED APPLICATIONS

This application claims priority under Paris Convention Priority to a patent application filed in the European Patent Office on Nov. 20, 2009, Serial No. 09 014 511.1, titled "Synthesis of Acrylic or Methacrylic Acid/Acrylate or Methacrylate Ester Polymers Using Pervaporation," which is hereby incorporated by reference in its entirety.

TECHNICAL FIELD

The following detailed description relates to the synthesis of copolymers or terpolymers of acrylic or methacrylic acid and acrylate or methacrylate ester by esterification of polyacrylic or polymethacrylic acid with various alcohols assisted by the pervaporation technique.

BACKGROUND

Acrylic and methacrylic acid and their esters are perhaps some of the most versatile monomers for improving performance characteristics of thousands of polymer and copolymer formulations. Major markets for copolymers of acrylic or methacrylic acid with acrylic or methacrylic esters include the fields of surface coatings, dispersions, textiles, adhesives, paper, and plastics. Acrylic acid/acrylate ester copolymers are considered as non-toxic.

The copolymerization of acrylic or methacrylic acid is generally known. The formation of copolymers from monomers is known to be a non-economic method. This is due to the cost of acrylic and methacrylic esters. On the other hand, the production of these copolymers by usual methods, such as esterification of polyacrylic or polymethacrylic acid with alcohol, is known to be based on an equilibrium reaction.

A major problem in the esterification of polyacrylic or methacrylic acid is removing water from the reaction mixture during its production due to the presence of an azeotropic water-alcohol mixture. Sometimes the boiling points of alcohol and water are very close, and sometimes some crosslinking reaction occurs at high temperature. The extraction of water from the reaction mixture using a traditional technique such as distillation is a non-economical method.

The synthesis of acrylic or methacrylic acid/acrylate or methacrylate ester copolymers directly from their corresponding monomer acids after esterification shows several problems.

A major problem in the esterification of acrylic or methacrylic acid is the high tendency of these monomers to polymerize owing to their reactive double bonds. This is true in particular if the acrylic or methacrylic acid is exposed to relatively high temperatures, cf. for example, PCT Publication No. WO 97/37962. In their preparation, purified ester compounds are exposed to temperatures which can readily trigger polymerization and can lead to polymer formation. This results in soiling the apparatus, pump, coating of column trays, and heat exchanger surfaces (fouling). Cleaning is complicated, expensive, and presents environmental problems, cf. German Patent No. DE 10 67 806 A. In addition, availability is greatly reduced.

As a rule, polymerization inhibitors (phenothiazine or p-methoxy-phenol)[1], i.e., compounds which are capable of substantially suppressing radical polymerization, therefore are added for stabilization. For using acrylates or methacrylates, however, the polymerization inhibitors have to be separated off. In the preparation of high-boiling point compounds which cannot be purified by distillation, it is possible to use only inhibitors which can be extracted by another method, for example, by extraction, filtration, or adsorption, or which do not interfere with processing. Thus, German Patent No. DE 28 38 691 A describes the use of Cu(I) oxide as an inhibitor. The Cu(I) can be removed by extraction. PCT Publication No. WO 90/07487 describes the use of hydroquinone addition with the active esterification mixture. The active carbon, which is filtered off after the esterification, is added in order to avoid discoloration of the ester due to the hydroquinone. U.S. Pat. No. 6,726,854 discloses the use of phosphates, such as triethyl phosphate, as a polymerization inhibitor.

Various acrylic esters are useful chemicals.[2] Esterification of acrylic acid with alcohol has commercially been performed by using liquid catalysts such as sulfuric acid, hydrofluoric acid, and para-toluenesulfonic acid; however, these are toxic, corrosive, and often hard to remove from the reaction solution.[3-5]

The esterification of acrylic or methacrylic acid generally is effected in a reactor to which a distillation condenser is attached. The said column serves to remove water from the reactor in the form of a mixture with the solvent. Reactors mostly used are stirred reactors with a double-wall. Their disadvantage here is that the stirrers frequently need to be repaired, and polymer is readily accumulated. Moreover, the reactor size is subject to limits because of the specific wall area available for heating with increasing reactor size.

Thus, it is an object of the present invention to provide an improved method for the synthesis of acrylic or methacrylic acid/acrylate or methacrylate ester copolymers or terpolymers.

SUMMARY

Methodology and products for synthesis of acrylic or methacrylic acid/acrylate or methacrylate ester polymers using pervaporation are described. In one aspect, a process is described for the production of a copolymer, preferably a poly(acrylic acid-co-acrylate ester) or a poly(methacrylic acid-co-methacrylate ester), or a terpolymer, preferably a poly(acrylic acid-co-acrylate ester(I)-co-acrylate ester(II)) or a poly(methacrylic acid-co-methacrylate ester(I)-co-methacrylate ester(II)) comprising:
  (a) esterifying a polyacrylic or polymethacrylic acid with one or two alcohols in the presence of an acid as a catalyst, preferably of a least amount of an acid as a catalyst; and
  (b) extracting water produced in (a) through a membrane.

In one embodiment, the process is a process for the production of a poly(acrylic acid-co-acrylate ester) copolymer or a poly(acrylic acid-co-acrylate ester(I)-co-acrylate ester(II)) terpolymer comprising:
  (a) esterifying a polyacrylic acid with one or two alcohols in the presence of an acid as a catalyst, preferably of a least amount of an acid as a catalyst; and
  (b) extracting water produced in (a) through a membrane.

In one embodiment, the process is a process for the production of a poly(methacrylic acid-co-methacrylate ester) copolymer or a poly(methacrylic acid-co-methacrylate ester(I)-co-methacrylate ester(II)) terpolymer comprising:
  (a) esterifying a polymethacrylic acid with one or two alcohols in the presence of an acid as a catalyst, preferably of a least amount of an acid as a catalyst; and (b) extracting water produced in (a) through a membrane.

In one embodiment, the process for the production of a poly(acrylic acid-co-acrylate ester) copolymer or a poly (methacrylic acid-co-methacrylate ester) copolymer comprises esterifying with one alcohol.

In one embodiment, the process for the production of a poly(acrylic acid-co-acrylate ester(I)-co-acrylate ester(II)) terpolymer or a poly(methacrylic acid-co-methacrylate ester (I)-co-methacrylate ester(II)) terpolymer comprises esterifying with two alcohols.

In one embodiment, polyacrylic acid is esterified with benzyl alcohol, resulting in a copolymer.

In one embodiment, polyacrylic acid is esterified with benzyl alcohol and cyclohexanol, resulting in a terpolymer.

In one embodiment, the acid, preferably sulfuric acid, is used in excess.

In one embodiment, the membrane is water selective.

In one embodiment, the water extracted through the membrane is trapped under liquid nitrogen.

In one embodiment, the membrane is a non-porous, dense membrane.

In one embodiment, the membrane is used in a pervaporation technique; i.e., the process comprises the step of extracting water produced during the esterification reaction using a pervaporation technique.

In one embodiment, the polyacrylic or polymethacrylic acid consists of more than three monomers; i.e., the molecular weight of polyacrylic or polymethacrylic acid is above trimer.

In one embodiment, the polyacrylic acid and the polymethacrylic acid which constitute the principal reactive components in this invention have a low molecular weight. This hydrosoluble polymer dissolves in appropriate amounts of alcohol employed as solvent and reactant simultaneously.

In one embodiment, the molecular weight of the polyacrylic or polymethacrylic acid is in the range of 400 g/mol to 10,000 g/mol.

In one embodiment, the alcohol used in this invention is liquid, little viscous, and dehydrated to more than 98%.

In one embodiment, the alcohol is selected from the group comprising an aliphatic and aromatic alcohol, preferably comprising methanol, ethanol, propanol, butanol, pentanol, iso-butanol, tert-butanol, cyclohexanol, and benzyl alcohol.

In one embodiment, the polyacrylic or polymethacrylic acid/alcohol solutions include molar fractions which depend on comonomers ratio in copolymers or terpolymers.

In one embodiment, the membrane comprises or is made of polyvinyl alcohol modified and crosslinked with a crosslinking agent at 2 to 6 weight %, and preferably at 2 to 5 weight %, using different techniques.

In one embodiment, the membrane has a thickness of about 5 µm to 200 µm, preferably of about 22 µm to 55 µm, and most preferably of about 25 µm.

In one embodiment, the copolymer or terpolymer is produced by esterifying an acidic site (i.e., a carboxyl group) of the polyacrylic acid with one or more alcohols.

In one embodiment, the copolymer or terpolymer is produced by esterifying an acidic site (i.e., a carboxyl group) of the polymethacrylic acid with one or more alkanols.

In one embodiment, the step of esterifying is carried out at a temperature in the range of about 30° C. to about 80° C.

In one embodiment, the alcohol is used both as the reaction partner in the esterification reaction and as a solvent of the polyacrylic or polymethacrylic acid.

In one embodiment, the conversion of esterification is controlled during removing water from the reaction, e.g., for the production of copolymers or terpolymers at controlled compositions.

In one embodiment, the copolymer or terpolymer is isolated from the alcohol by precipitation, preferably in petroleum ether.

In one embodiment, the copolymer is a poly(acrylic acid-co-alkyl acrylic ester) or a poly(methacrylic acid-co-alkyl methacrylic ester).

In one embodiment, the terpolymer is a poly(acrylic acid-co-alkyl acrylate(I)-co-alkyl acrylate(II)) or a poly(methacrylic acid-co-alkyl acrylate(I)-co-alkyl methacrylate(II)).

The object of the present invention is further solved by a use of a membrane in the production of a copolymer, preferably a poly(acrylic acid-co-acrylate ester) or a poly(methacrylic acid-co-methacrylate ester), or a terpolymer, preferably a poly(acrylic acid-co-acrylate ester(I)-co-acrylate ester (II)) or a poly(methacrylic acid-co-methacrylate ester(I)-co-methacrylate ester(II)), for extracting water produced during esterification of polyacrylic or polymethacrylic acid with one or two alcohols in the presence of an acid as a catalyst, preferably of a least amount of an acid as a catalyst.

In one embodiment, the use is a use of a membrane in the production of a poly(acrylic acid-co-acrylate ester) copolymer or a poly(acrylic acid-co-acrylate ester(I)-co-acrylate ester(II)) terpolymer for extracting water produced during esterification of polyacrylic acid with one or two alcohols in the presence of an acid as a catalyst, preferably of a least amount of an acid as a catalyst.

In one embodiment, the use is a use of a membrane in the production of a poly(methacrylic acid-co-methacrylate ester) copolymer or a poly(methacrylic acid-co-methacrylate ester (I)-co-methacrylate ester(II)) terpolymer for extracting water produced during esterification of polymethacrylic acid with one or two alcohols in the presence of an acid as a catalyst, preferably of a least amount of an acid as a catalyst.

In one embodiment of the use, the membrane is a non-porous, dense membrane.

In one embodiment of the use, the membrane is used in a pervaporation technique; i.e., the use is a use of a pervaporation technique in the production of the copolymer or terpolymer.

In one embodiment of the use, the membrane comprises or is made of polyvinyl alcohol modified and crosslinked with a crosslinking agent at 2 weight % to 6 weight %, and preferably at 2 weight % to 5 weight %, using different techniques.

In one embodiment of the use, the membrane has a thickness of about 5 µm to 200 µm, preferably of about 22 µm to 55 µm, and most preferably of about 25 µm.

The present invention relates to a method for producing acrylic or methacrylic acid/acrylate or methacrylate ester copolymers or terpolymers by esterification of polyacrylic acid or polymethacrylic acid with several alcohols (aliphatics and aromatics) using the pervaporation technique. The reaction mixtures are fixed at their optimum temperature by circulation of water via an external thermostat. The water produced by the reaction is extracted selectively during its formation through an adequate membrane. The method according to the invention allows for the production of copolymers or terpolymers at controlled compositions (0 mol % to 87 mol %). The pervaporation apparatus employed in this invention is similar to that used by different authors, such as Bing Cao et al.[6]

The starting material in the process for the production of a copolymer or terpolymer is polyacrylic or polymethacrylic acid which is reacted with a variety of alcohols in order to manipulate the type of alkyl group and also the type of ester.

As an example, the process is a modification of polyacrylic or polymethacrylic acid to convert them to a copolymer of one of the following:

(1) category of copoly(acrylic acid-alkyl acrylate), where the alkyl group is changeable; or
(2) category of copoly(methacrylic acid-methacrylic esters), where the ester can be varied.

Pervaporation is an energy efficient and highly selective extraction process for the extraction of volatile products and for the dehydration of organic chemicals.[7] The productivity and conversion rate can be significantly increased when the reaction is coupled with pervaporation, i.e., a pervaporation reactor. Techno-economic studies revealed that pervaporation reactors have good market potential in process industries.

The combination of an esterification reaction of polyacrylic or polymethacrylic acid with a pervaporation process increases the conversion of reversible reactions, such as esterification, by selectively removing the water formed from the reacting mixture. Thus, the yield of the conversion is greatly enhanced.

An esterification reaction between an alcanol and a carboxylic acid in the presence of a catalyst is a reversible reaction, and a high industrial conversion can be achieved by adding a large excess of acid. A water selective pervaporation membrane can be used in the esterification reactor. This can shift the equilibrium to the right, thus reducing excess reactants.

The composition of acrylic or methacrylic ester comonomers can be easily controlled during the removal of water from the reaction by a kinetic of extraction. The high rate of comonomer ester in the copolymers (87%) is favored by the selective extraction of water during its production.

Thus, the production of copolymers (acrylic or methacrylic acid/acrylate or methacrylate ester) at different compositions by esterification assisted by a pervaporation technique can be a competitive method. This method is economical (energy saving) and clean (without addition of a tiers component or catalysts to the reaction mixture).

DETAILED DESCRIPTION

The present invention will now be described more specifically with reference to the following examples. It is to be noted that the following explanations are presented herein for the purposes of illustration and description only; they are not intended to be exhaustive or to limit the invention to the precise form disclosed or claimed.

A reaction of copolymerization is shown below:

$$[CH_2-CHOH]_n + mR-OH \rightarrow [CH_2-CHOH]_{n'} - [CH_2-CHOOR]_{m'} + m'H_2O + m''R-OH$$

$n = n' + m'$ and $m = m' + m''$

A reaction of terpolymerization is shown below:

$$[CH_2-CHCO_2H]_n + mR-OH + pR'-OH \rightarrow [CH_2-CHCO_2H]_{n'} - [CH_2-CHOOR]_{m'} - [CH_2-CHOOR']_{p'} + (m'+p')H_2O + m''R-OH + p''R'-OH$$

$N = n' + m'$, $m = m' + m''$ and $p = p' + p''$

The preferred process embodied in this invention utilizes the polyacrylic or polymethacrylic acid with low molecular weights (400 g/mol to 10,000 g/mol) which may be esterified using one or more of the series of liquid alcohols. It is preferable to add some drops of sulfuric acid to the reaction mixture as a catalyst.

Concerning the lower alcanol such as methanol, ethanol, propanol, pentanol, isopropanol, and butanol, it is preferable to add this reactant in excess to compensate for the amount of risk which accompanies the water during its extraction in addition to its role as a solvent in which esterification is carried out.

Concerning viscous or higher alcohols, a raising of temperature is necessary for increasing the kinetics of the reaction.

For example, the conditions of exemplary reactions are illustrated in Tables 1 to 3 below.

TABLE 1

Conditions of poly(acrylic acid-co-acrylic ester) synthesis

| Alcohol* (mol) | Polyacrylic acid (mol) | Time (hr) | Copolymer (acrylic acid/alkylacrylate) composition (mol %) |
|---|---|---|---|
| 0.20-0.30 | 0.012-0.01 | 1-1.3 | 15-28 |
| 0.20-0.30 | 0.012-0.01 | 3-3.5 | 22-37 |
| 0.20-0.30 | 0.012-0.01 | 5-6 | 37-54 |
| 0.20-0.30 | 0.012-0.01 | 7-8 | 64-72 |
| 0.20-0.30 | 0.012-0.01 | 18-20 | 82-87 |

*Alcohol: methanol; ethanol; propanol; iso-propanol; butanol; iso-butanol; cyclohexanol; benzyl alcohol

TABLE 2

Condition of poly(methacrylic acid-co-alkylmethacrylic ester) synthesis

| Alcohol* (mol) | Polymethacrylic acid (mol) | Time (hr) | Copolymer (methacrylic acid/alkylmethacrylate) composition (mol %) |
|---|---|---|---|
| 0.13-0.20 | 0.012-0.010 | 1-1.3 | 12-25 |
| 0.13-0.20 | 0.012-0.010 | 3-3.5 | 18-29 |
| 0.13-0.20 | 0.012-0.010 | 5-6 | 32-44 |
| 0.13-0.20 | 0.012-0.010 | 7-8 | 58-63 |
| 0.13-0.20 | 0.012-0.010 | 18-20 | 72-82 |

*Alcohol: methanol; ethanol; propanol; iso-propanol; butanol; iso-butanol; cyclohexanol; benzyl alcohol

TABLE 3

Conditions of poly(acrylic acid-co-alkylacrylate(I)-co-alkylacrylate(II)) synthesis

| Alcohol*(I)/ alcohol(II) (mol/mol) | Polyacrylic acid (mol) | Time (hr) | Terpolymer (acrylic acid/alkylacrylate(I)/ alkylacrylate(II)) composition (mol %) |
|---|---|---|---|
| 0.07/0.07 | 0.01-0.008 | 1-1.3 | (57/34/05)-42/28/30 |
| 0.07/0.07 | 0.01-0.008 | 3-3.5 | (41/38/21)-34/32/34 |
| 0.07/0.07 | 0.01-0.008 | 5-6 | (32/45/23)-28/47/25 |
| 0.07/0.07 | 0.01-0.008 | 7-8 | (27/52/21)-19/67/14 |
| 0.07/0.07 | 0.01-0.008 | 18-20 | (14/62/24)-12/72/16 |

*Alcohol: methanol; ethanol; propanol; iso-propanol; butanol; iso-butanol; cyclohexanol; benzyl alcohol The copolymers or terpolymers obtained at the end of the reaction were isolated by precipitation in excess of petroleum ether.

The membrane used in this process is confectioned in polyvinyl alcohol (PVA), physically crosslinked. The crosslinked film produced was dried under vacuum at 30° C. to 70° C. for several hours. The thickness of each membrane was about 5 µm to 200 µm.

The pervaporation apparatus used in this work is similar to that reported in the literature and comprises the following parts: stainless steel pervaporation cell; pervaporation Pyrex-made receiving set filled with vapor traps; and primary vacuum pump.

The different runs were carried out at a temperature in the range of from 30° C. to 80° C. The reaction mixture was in contact with the membrane for over 24 hours to reach a steady state before starting the experiment. Different runs were at least in duplicate, and the results were quite reproducible.

In addition to the previous parameters of the PVA, its crystallinity degree was found to be 20% to 30%.

The swelling performance of PVA membrane with different constituents of the esterification reaction can be deduced from the curves (swelling degree versus time at temperatures of 30° C. to 50° C.). The result shows a strong affinity between water and PVA, whereas swelling in alcohol is very weak for the lower alcohol, and very weak or nil for the higher alcohol.

The conversion of the reaction varies with time and temperature, for example, 80% to 87% after 6 hours to 7 hours at 40° C. to 50° C.

Example 1

Preparation of a Copolymer of Acrylic Acid and Acrylate Ester Having an Acid Number 15 and Benzyl Alcohol as Raw Materials About 0.10 mol (100 g) of polyacrylic acid containing 1.5 mol of acrylic acid units corresponds to 1.5 mol (162 g) of benzyl alcohol for esterifying 100% of acrylic acid in main chains. Thus, after 18 hours of reaction assisted by pervaporation, a maximum of 87% acid units in main chains have been esterified.

The pervaporation apparatus employed in the present invention was previously described by Bing Cao et al.[6]

Accordingly, 100 g of polyacrylic acid is introduced into the pervaporation cell containing initially 162 g of benzyl alcohol and 3 drops of $10^{-1}$ N aqueous solution of sulfuric acid. It is preferable to add the benzyl alcohol in excess to compensate the amount which risk to be accompanied by water during its extraction. The reaction mixture was fixed at 50° C. and stirred using a magnetic stirrer. The thickness of the membrane was estimated to be 25 μm.

The structure of copo(acrylic acid/benzylacrylate) at different compositions is confirmed by IR, NMR, and DSC analysis.

Example 2

Preparation of a Terpolymer of Acrylic Acid, Cyclohexylacrylate, and Benzylacrylate Esters from Polyacrylic Acid, Cyclohexylalcohol, and Benzyl Alcohol A solution containing about 100 g of polyacrylic acid, 162 g of benzyl alcohol, and 150 g of cyclohexanol is introduced into the pervaporation cell. Three or four drops of an aqueous solution of sulfuric acid were added to the mixture. An alcohol was added in excess to compensate for the amount which risk accompanies the water during its extraction and is also considered as solvent in which the esterification is carried out. The mixture was stirred using a magnetic stirrer. Thus, after 18 hours of reaction assisted by pervaporation, a maximum of 82% esterification of acid units was achieved in main chains distributed statistically. The composition of terpolymers obtained in different units depends on the composition of the initial mixture, the reaction time, and the temperature of the reaction.

The structure of terpolymers is confirmed by IR, NMR, and DSC analysis.

REFERENCES

1. P. Dupont, J. C. Vedrine, E. Paumard, G. Hecquet, F. Lefebvre, Applied Catalysis A.: General 129 (1995) 2017.
2. Hydrocarbon Processing, November 1979, Nippon Shokubai Kagaku Kogyo Co., p. 123.
3. G. A. Olah, Friede-Crafts Chemistry, Wiley Interscience, New York, 1973.
4. D. Jaques and J. A. Leisten, J. Chem. Soc. (1964) 2683.
5. J. M. Khurana, P. K. Sahoo and G. C. Maitkap, Synth. Commun., 20 (1990) 2267.
6. Bing Cao et al., J. of Membr. Sci. 156 (1999) 43.
7. Wasewar, Kailas L.; Patidar, Shaymababu; and Agarwal, Vijay K. (2008) "Pervaporation Reactor for Esterification of Acetic Acid with n-Butanol: Modeling and Simulation," International Journal of Chemical Reactor Engineering: Vol. 6: A93.

The invention claimed is:

1. A process for the production of a copolymer, comprising:
    (a) esterifying a polyacrylic or polymethacrylic acid with one or two alcohols in the presence of a strong acid as a catalyst in a reacting mixture forming water; and
    (b) extracting the water directly from the reacting mixture through a membrane without distillation of the reacting mixture; and
    wherein esterification in (a) is carried out at a temperature in the range of 30° C. to about 50° C.

2. The process according to claim 1, further comprising:
    (c) trapping the water extracted in (b) under liquid nitrogen.

3. The process according to claim 1 wherein the membrane is a non-porous membrane.

4. The process according to claim 1 wherein the membrane is used in a pervaporation technique.

5. The process of claim 1 wherein the polyacrylic or polymethacrylic acid includes more than three monomers.

6. The process of claim 1 wherein the molecular weight of the polyacrylic or polymethacrylic acid is in the range of 400 g/mol to 10,000 g/mol.

7. The process of claim 1 wherein the alcohol is selected from one of an aliphatic and aromatic alcohol, comprising methanol, ethanol, propanol, butanol, pentanol, iso-butanol, tert-butanol, cyclohexanol, or benzyl alcohol.

8. The process of claim 1 wherein the membrane comprises polyvinyl alcohol modified and crosslinked with a crosslinking agent at 2 weight % to 6 weight %.

9. The process of claim 1 wherein the membrane has a thickness of about 5 μm to 200 μm.

10. The process of claim 1 wherein a conversion of esterification is controlled during removing water from the reaction.

11. The process of claim 1 wherein the copolymer or terpolymer is isolated from the alcohol by precipitation.

12. A use of a membrane in the production of a copolymer, the production of the copolymer including a step of extracting, through the membrane without distillation of the reacting mixture, water directly from a reacting mixture forming the water during esterification of polyacrylic or polymethacrylic acid with one or two alcohols in the presence of a strong acid as a catalyst, wherein esterification is carried out at a temperature in the range of 30° C. to about 50° C.

13. The use according to claim 12 wherein the membrane is a non-porous membrane.

14. The use according to claim 12 wherein the membrane is used in a pervaporation technique.

15. The use according to claim 12 wherein the membrane comprises polyvinyl alcohol modified and crosslinked with a crosslinking agent at 2 weight % to 6 weight %.

16. The use according to claim 12 wherein the membrane has a thickness of about 5 μm to 200 μm.

17. The use according to claim 14 wherein the membrane has a thickness of about 5 μm to 200 μm.

18. The process according to claim 1, wherein the strong acid is sulfuric acid.

19. The process according to claim 12, wherein the strong acid is sulfuric acid.

\* \* \* \* \*